(12) United States Patent
Moon et al.

(10) Patent No.: US 7,835,329 B2
(45) Date of Patent: Nov. 16, 2010

(54) MOBILE COMMUNICATION SYSTEM, MOBILE STATION, AND RADIO CONTROL DEVICE

(75) Inventors: Sung Uk Moon, Yokosuka (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1058 days.

(21) Appl. No.: 10/568,589

(22) PCT Filed: Aug. 20, 2004

(86) PCT No.: PCT/JP2004/012026

§ 371 (c)(1),
(2), (4) Date: Oct. 24, 2006

(87) PCT Pub. No.: WO2005/020471

PCT Pub. Date: Mar. 3, 2005

(65) Prior Publication Data

US 2007/0190997 A1 Aug. 16, 2007

(30) Foreign Application Priority Data

Aug. 21, 2003 (JP) .......................... P2003-208290
Dec. 22, 2003 (JP) .......................... P2003-425631

(51) Int. Cl.
*H04W 4/00* (2009.01)
(52) U.S. Cl. .................. 370/338; 370/342; 370/343; 370/328; 370/335; 370/326
(58) Field of Classification Search .............. 455/436, 455/432.1, 437, 438, 442; 370/343, 342, 370/338, 328, 326, 335
See application file for complete search history.

(56) References Cited

U.S. PATENT DOCUMENTS 6,094,427 A * 7/2000 Yi .............................. 370/331
6,678,523 B1 * 1/2004 Ghosh et al. ................ 455/442

(Continued)

FOREIGN PATENT DOCUMENTS

CN 1666454 A 9/2005

(Continued)

OTHER PUBLICATIONS

"3 GPP TS 23.041", V3.3.0, 2000.

(Continued)

*Primary Examiner*—Charles N Appiah
*Assistant Examiner*—Kwasi Karikari
(74) *Attorney, Agent, or Firm*—Oblon, Spivak, McClelland, Maier & Neustadt, L.L.P.

(57) ABSTRACT

It is an object of this invention to select an information receiving method at a mobile station (MS) so as to avoid an increase in the transmission power of a base transceiver station (BTS) or redundancy or loss of received information at the mobile station (MS) in broadcast communication or multicast communication. A mobile station according to this invention includes a receiving method selection information acquiring unit (11, 14, 15, 16) for acquiring receiving method selection information for receiving the same information transmitted via a plurality of cells, and a determining unit (12) for determining whether to perform soft combining or selective combining on the same information based on the receiving method selection information.

22 Claims, 13 Drawing Sheets

U.S. PATENT DOCUMENTS

| | | | |
|---|---|---|---|
| 6,690,659 B1 * | 2/2004 | Ahmed et al. | 370/328 |
| 6,999,434 B1 * | 2/2006 | Agrawal et al. | 370/331 |
| 2003/0207696 A1 | 11/2003 | Willenegger et al. | |

FOREIGN PATENT DOCUMENTS

| | | |
|---|---|---|
| JP | 09-233075 | 9/1997 |
| JP | 2003-069459 | 3/2003 |
| JP | 2003-69459 | 3/2003 |

OTHER PUBLICATIONS

"3 GPP TS 25.324", V3.3.0, 2000.

* cited by examiner

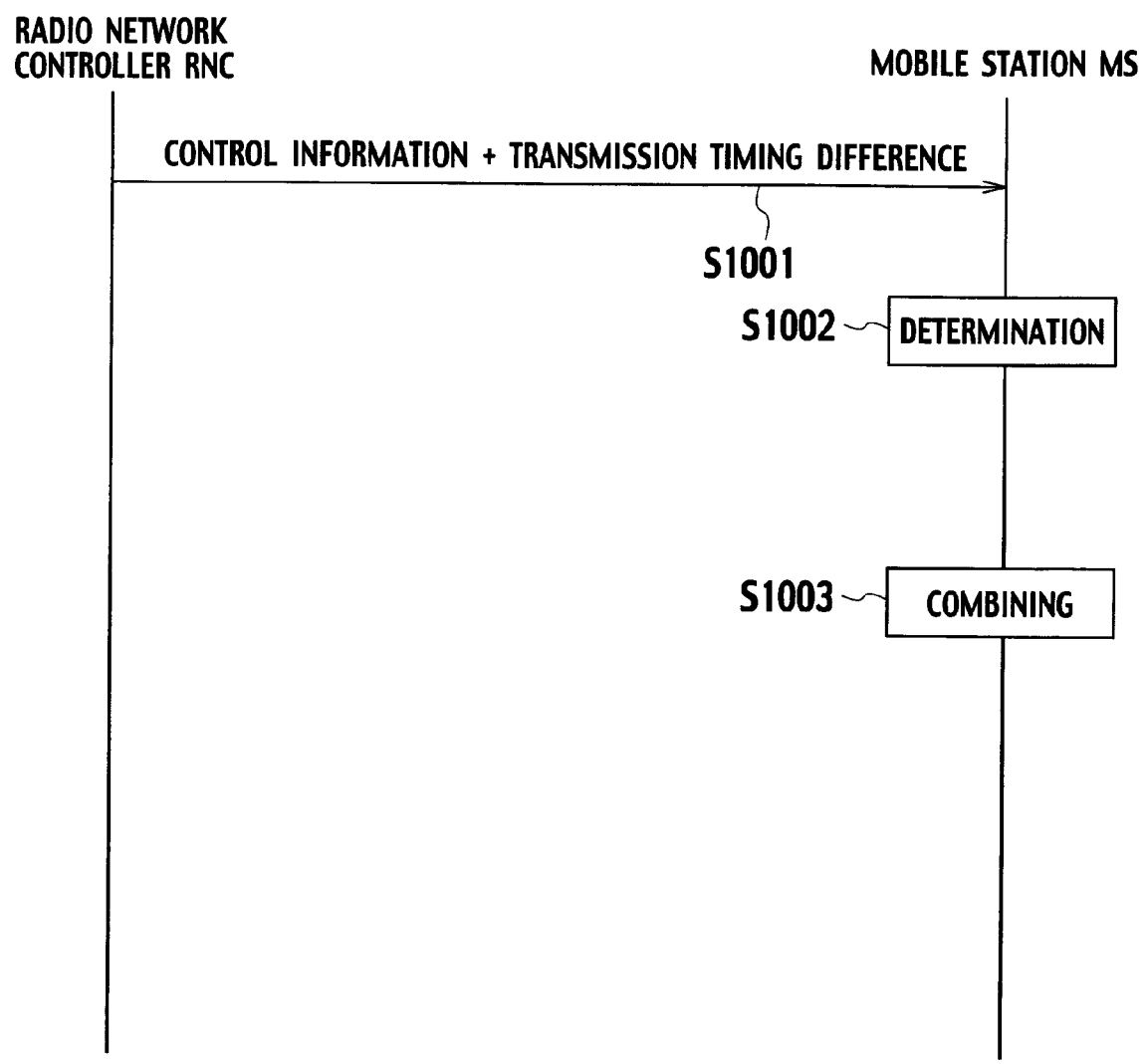

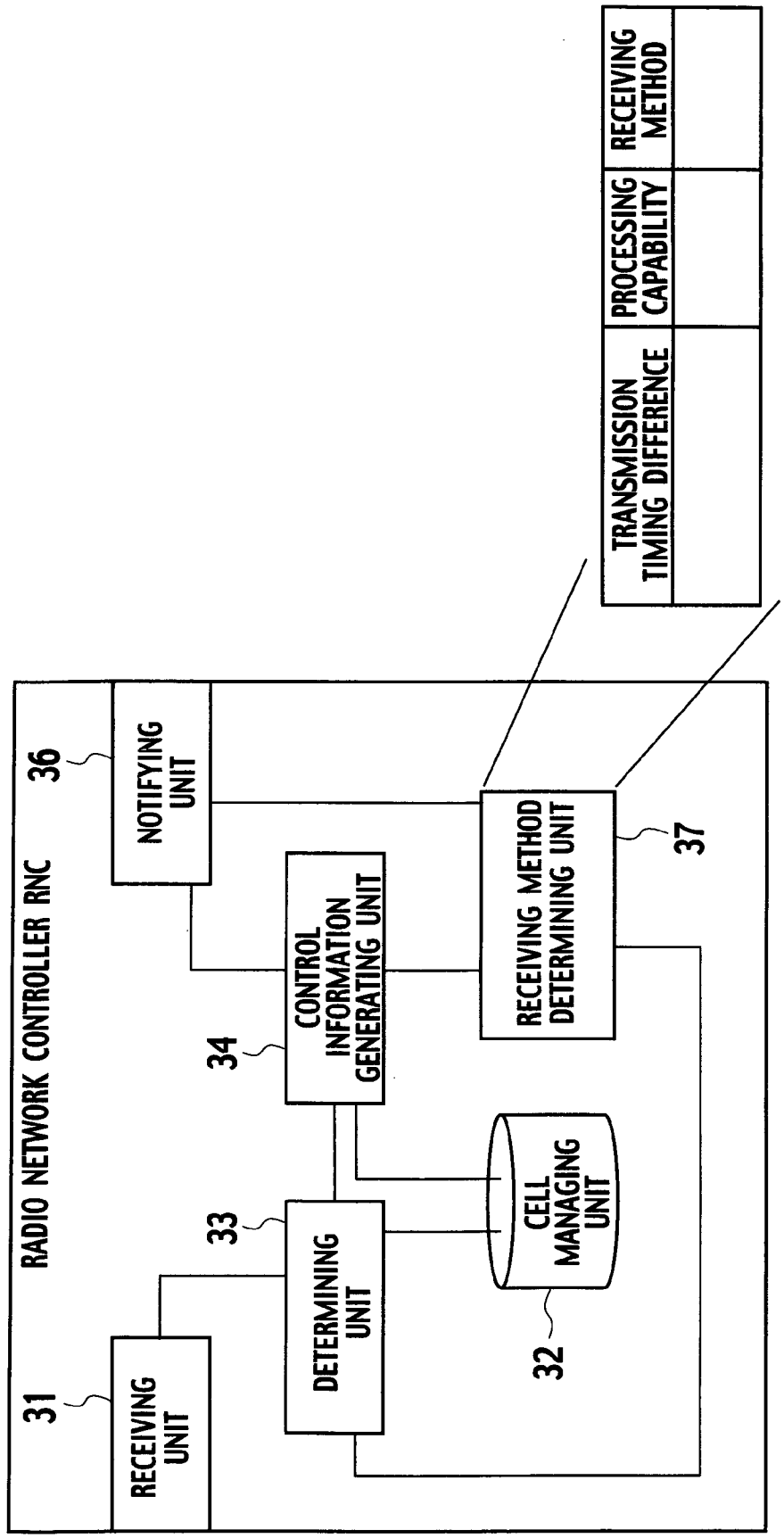

MOBILE COMMUNICATION SYSTEM, MOBILE STATION, AND RADIO CONTROL DEVICE

TECHNICAL FIELD

The present invention relates to mobile communication systems for transmitting the same information to a mobile station via a plurality of cells, and a mobile station and a radio network controller.

BACKGROUND ART

Conventional second-generation mobile communication systems such as PDC (Personal Digital Cellular) have adopted a handover scheme in which a mobile station, when moving between cells while communicating, establishes a communication channel with a handover target cell after releasing a communication channel with a handover source cell (hard handover scheme).

On the other hand, conventional CDMA mobile communication systems have adopted a handover scheme in which a mobile station, when moving between cells while communicating, adds a communication channel with a handover new cell before releasing a communication channel with a handover current cell (soft handover scheme).

In this specification, a base transceiver station may be configured to manage one cell or may be configured to manage a plurality of cells.

In the soft handover scheme, a mobile station is configured to simultaneously establish a plurality of communication channels with a plurality of cells for communication in a given area near the boundary between the cells.

FIGS. 1(a) to 1(d) show information transmitting methods in the soft handover scheme. As shown in FIGS. 1(a) to 1(d), multiple information transmitting methods have been known.

In an uplink information transmitting method in the soft handover scheme shown in FIG. 1(a), a base transceiver station BTS receives information from a mobile station MS via a plurality of cells, and performs soft combining on the received information for transmission to a radio network controller RNC.

In another uplink information transmitting method in the soft handover scheme shown in FIG. 1(b), a plurality of base transceiver stations BTS1 and BTS2 receive information from a mobile terminal MS in their managing cells, respectively, and transmit the received information to a radio network controller RNC together with reliability information corresponding to reception qualities (such as received power, received SIRs, received error rates, or CRC check results). The radio network controller RNC performs selective combining to select information of the highest reliability among the information from the base transceiver stations BTS1 and BTS2, based on the reliability information from the base transceiver stations BTS1 and BTS2, and transmits the information after selective combining to an upper node (not shown).

A downlink information transmitting method in the soft handover scheme shown in FIG. 1(c), a base transceiver station BTS distributes information from a radio network controller RNC and transmits the same information to a plurality of cells. A mobile station MS receives the same information via the plurality of cells and performs soft combining on the received same information.

In another downlink information transmitting method in the soft handover scheme shown in FIG. 1(d), a radio network controller RNC distributes information from an upper node and transmits the same information to a plurality of base transceiver stations BTS1 and BTS2. A mobile station MS receives the same information from a plurality of cells (base transceiver stations BTS1 and BTS2) and performs soft combining on the received same information.

In the conventional mobile communication systems, broadcast communication has been known, in which, as shown in FIG. 2, one or more base transceiver stations BTS simultaneously transmit the same information to an unspecified large number of mobile stations MS in a given cell(s) (e.g., see non-patent literature 1).

Also, in the conventional mobile communication systems, multicast communication has been known, in which, as shown in FIG. 3, the same information is transmitted to a plurality of mobile stations MS belonging to a particular group (e.g., see non-patent literature 2).

In the broadcast communication and multicast communication, in order to reduce redundancy and loss of received information at a mobile station MS due to movement between cells, a method of transmitting the same information by performing timing synchronization with a plurality of cells has been conceived.

(Non-Patent Literature 1)
$3^{rd}$ Generation Partnership Project Technical Specification Group Terminals, 23.041 Technical realization of Cell Broadcast Service (CBS), October, 2000

(Non-Patent Literature 2)
$3^{rd}$ Generation Partnership Project Technical Specification Group Radio Access Network, 25.324 Broadcast/Multicast Control BMC, December, 2000

In the conventional mobile communication systems as described above, however, a mobile station MS cannot check the accuracy of timing synchronization or an information receiving method (e.g., soft combining, selective combining, or no combining processing) for transmission of the same information from a plurality of cells, and cannot select an optimum information receiving method. This causes the problem of an increase in the transmission power of a base transceiver station BTS due to deterioration of reception quality at the mobile station MS, or redundancy or loss of received information at the mobile station MS.

The present invention has been made in view of the above problem, and has an object of providing a mobile communication system, a mobile station and a radio network controller which enable selection of an information receiving method at a mobile station MS so as to avoid an increase in the transmission power of a base transceiver station BTS or redundancy or loss of received information at the mobile station MS in broadcast communication or multicast communication.

DISCLOSURE OF THE INVENTION

According to a first aspect of the present invention, there is provided a mobile communication system for transmitting same information to a mobile station via a plurality of cells, wherein: the mobile station is configured to determine whether to perform soft combining or selective combining on the same information received, based on receiving method selection information for receiving the same information via the plurality of cells.

In the first aspect of the present invention, the radio network controller may be configured to provide, as the receiving method selection information, control information including information as to whether broadcast service or multicast service can be provided or not in a neighboring cell of a current cell in which the mobile station is located.

According to a second aspect of the present invention, there is provided a mobile communication system for transmitting same information to a mobile station via a plurality of cells, wherein: the mobile station is configured to determine whether to perform soft combining or selective combining, or not to perform combining processing on the same information received, based on receiving method selection information for receiving the same information via the plurality of cells.

According to a third aspect of the present invention, a receiving method selection information acquiring unit configured to acquire receiving method selection information for receiving same information transmitted via a plurality of cells, and a determining unit configured to determine whether to perform soft combining or selective combining on the same information received, based on the receiving method selection information, are included.

In the third aspect of the present invention, the determining unit may be configured to determine whether to perform soft combining or selective combining, or not to perform combining processing on the received same information, based on the receiving method selection information.

In the third aspect of the present invention, the receiving method selection information acquiring unit may be configured to acquire receiving method instruction information showing soft combining or selective combining from a network or a base transceiver station; and the determining unit may be configured to perform the determination based on the receiving method instruction information.

In the third aspect of the present invention, the receiving method selection information acquiring unit may be configured to receive, as the receiving method selection information, transmission timing information on the plurality of cells from the plurality of cells, respectively; a transmission timing difference measuring unit configured to measure a transmission timing difference between the plurality of cells, based on the received pieces of transmission timing information, may be further included; and the determining unit may be configured to perform the determination based on the transmission timing difference.

In the third aspect of the present invention, the receiving method selection information acquiring unit may be configured to receive, as the receiving method selection information, a transmission timing difference between the plurality of cells from a network or a base transceiver station; and the determining unit may be configured to perform the determination based on the transmission timing difference.

In the third aspect of the present invention, the receiving method selection information acquiring unit may be configured to acquire, as the receiving method selection information, control information including information as to whether broadcast service or multicast service can be provided or not in a neighboring cell of a current cell in which the mobile station is located; and the determining unit may be configured to perform the determination based on the control information.

In the third aspect of the present invention, the control information may be configured to include channel information on a radio channel used in the neighboring cell.

In the third aspect of the present invention, the receiving method selection information acquiring unit may be configured to acquire, as the receiving method selection information, a difference between a transmission timing in the neighboring cell in which broadcast service or multicast service can be provided and a transmission timing in the current cell; and the determining unit may be configured to perform the determination based on the control information and the transmission timing difference.

In the third aspect of the present invention, the determining unit may be configured to perform the determination on the same information received from the neighboring cell in which broadcast service or multicast service can be provided.

In the third aspect of the present invention, a storage unit configured to associate and store transmission timing differences and combining methods for the same information may be further included; and the determining unit may be configured to perform the determination based on the combining method associated with the received transmission timing difference.

In the third aspect of the present invention, a storage unit configured to associate and store transmission timing differences, processing capabilities of the mobile station, and combining methods for the same information may be further included; and the determining unit may be configured to perform the determination based on the combining method associated with the received transmission timing difference and the processing capability of the mobile station.

In the third aspect of the present invention, the determining unit may be configured to determine that soft combining be performed on the received same information, by using all predetermined reliability information corresponding to reception qualities of radio channels used in the plurality of cells, when the received transmission timing difference has a value within a first range.

In the third aspect of the present invention, the determining unit may be configured to determine that selective combining be performed on the received same information, by comparing part of predetermined reliability information corresponding to reception qualities of radio channels used in the plurality of cells, when the received transmission timing difference has a value within a second range.

According to a fourth aspect of the present invention, there is provided a radio network controller for use in a mobile communication system for transmitting same information to a mobile station via a plurality of cells, including a determining unit configured to determine whether broadcast service or multicast service can be provided or not in a neighboring cell of a current cell in which the mobile station is located; and a notifying unit configured to provide control information including a result of the determination, as receiving method selection information for receiving the same information at the mobile station.

In the fourth aspect of the present invention, the notifying unit may be configured to provide, as the receiving method selection information, only the control information on the neighboring cell in which broadcast service or multicast service can be provided.

In the fourth aspect of the present invention, the control information may be configured to include channel information on a radio channel used in the neighboring cell.

In the fourth aspect of the present invention, such that the notifying unit may be configured to transmit, as the receiving method selection information, a difference between a transmission timing in the neighboring cell in which broadcast service or multicast service can be provided and a transmission timing in the current cell.

In the fourth aspect of the present invention, a receiving method instructing unit configured to provide an instruction on whether to perform soft combining or selective combining on the same information received at the mobile station, based on the receiving method selection information, may be further included.

According to a fifth aspect of the present invention, there is provided a radio network controller for use in a mobile communication system for transmitting same information to a mobile station via a plurality of cells, including a receiving method instructing unit configured to provide an instruction on whether to perform soft combining or selective combining on the same information received at the mobile station, based on a transmission timing difference between the plurality of cells.

In the fifth aspect of the present invention, the receiving method instructing unit may be configured to provide the instruction based on the transmission timing difference between the plurality of cells and a processing capability of the mobile station.

BRIEF DESCRIPTION OF DRAWINGS

FIG. 13 is a sequence diagram showing operation in a mobile communication system according to the fourth embodiment of the present invention; and FIG. 14 is a functional block diagram of a radio network controller according to a fifth embodiment of the present invention.

BEST MODE FOR CARRYING OUT THE INVENTION

Mobile Communication System in First Embodiment of the Invention

Figure 1:
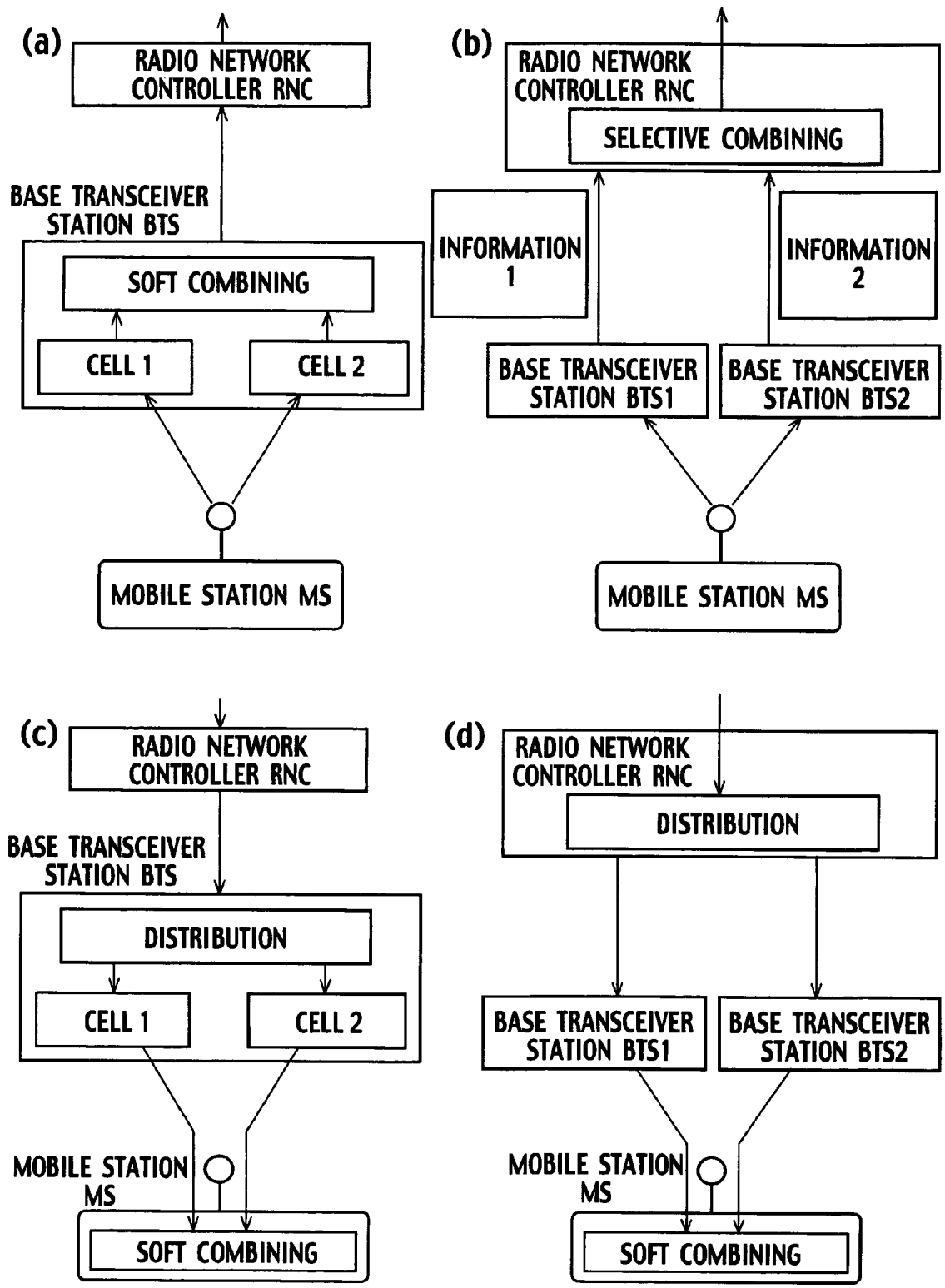
FIGS. 1(a) to 1(d) are diagrams for illustrating information transmitting methods in a soft handover scheme according to a conventional art.
Figure 2:
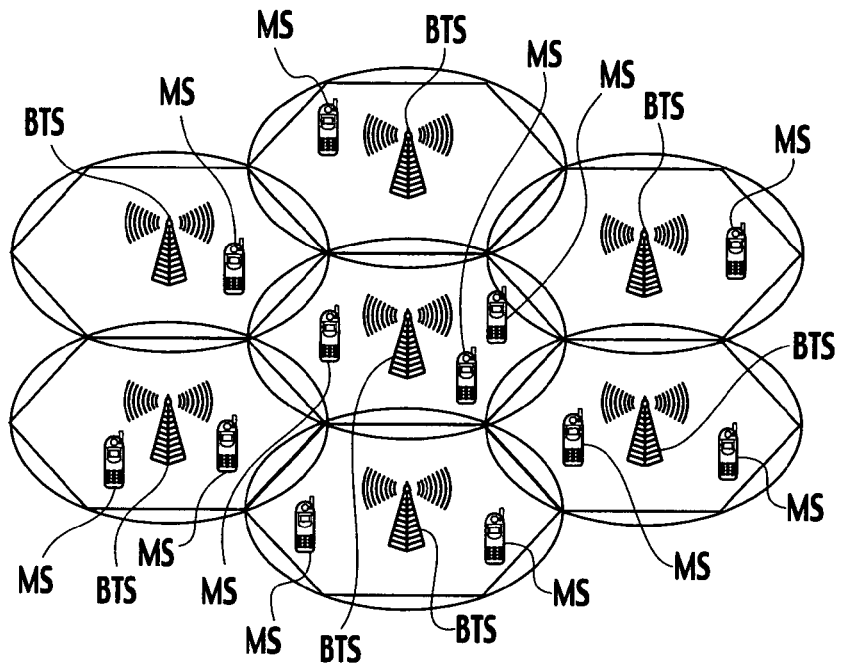
FIG. 2 is a diagram for illustrating broadcast communication according to a conventional art.
Figure 3:
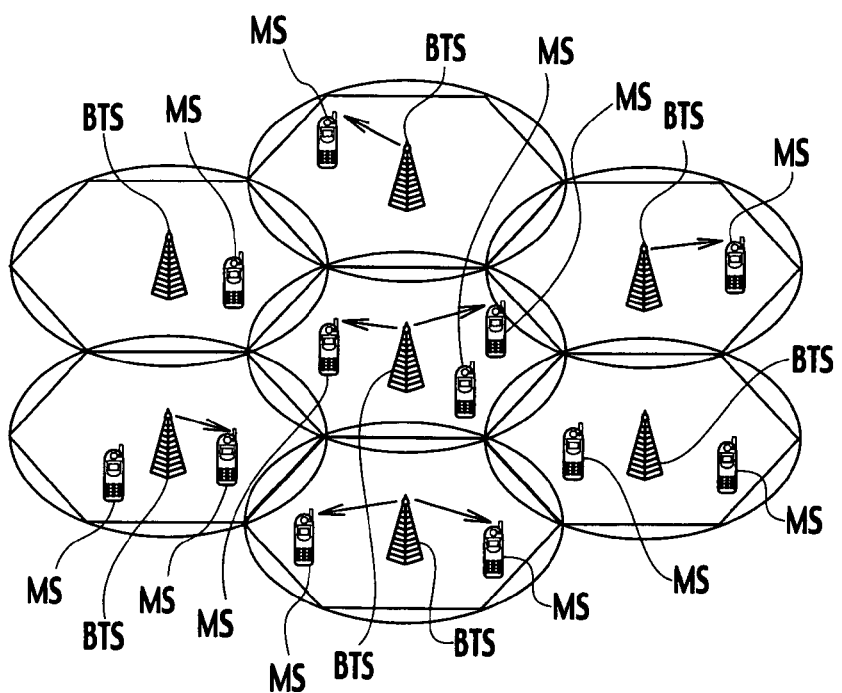
FIG. 3 is a diagram for illustrating multicast communication according to a conventional art.
Figure 4:
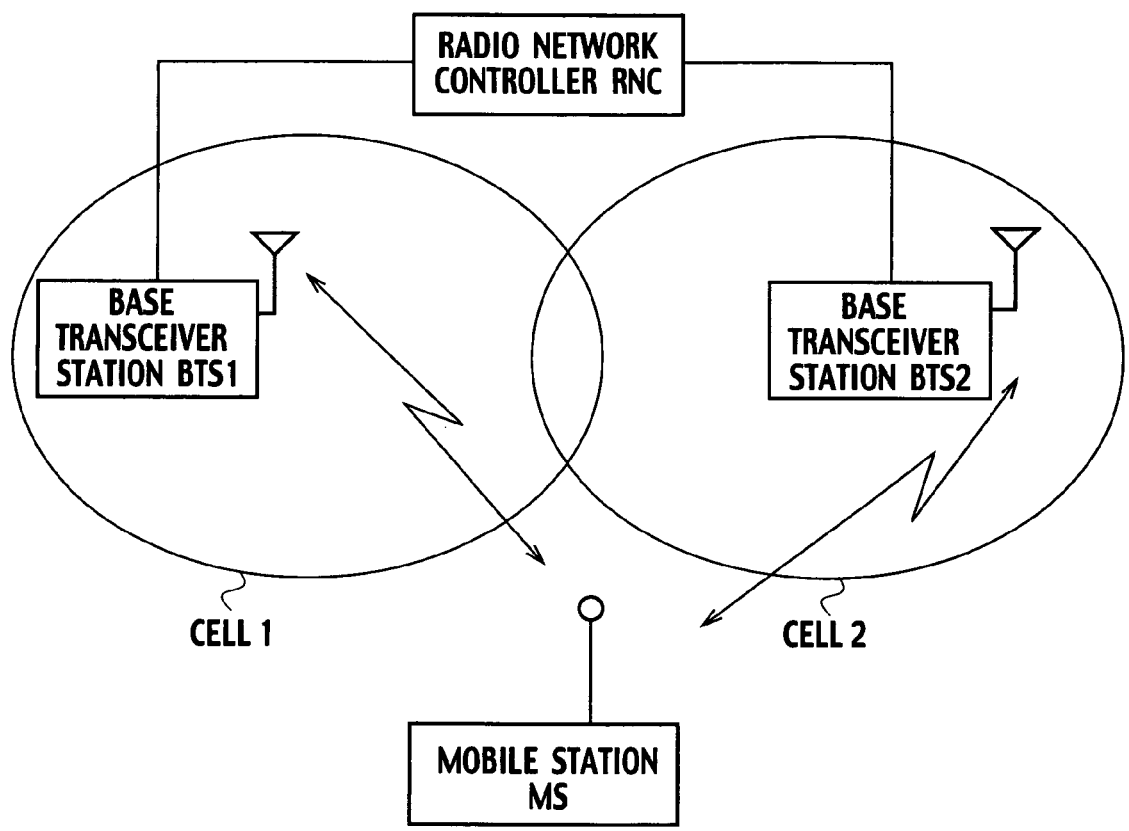
FIG. 4 is an overall configuration diagram of a mobile communication system according to the present invention.

FIG. 4 shows an overall configuration diagram of a mobile communication system according to a first embodiment of the present invention. The mobile communication system according to this embodiment includes two base transceiver stations BTS1 and BTS2 under a radio network controller RNC as shown in FIG. 4.

Suppose that a mobile station MS is performing a soft handover between the base transceiver station BTS1 and the base transceiver station BTS2 when moving from a cell 1 managed by the base transceiver station BTS1 to a cell 2 managed by the base transceiver station BTS2, or being located in an area where it can receive signals of the cell 1 and the cell 2. Also, suppose that the mobile station MS is performing broadcast communication or multicast communication in the mobile communication system of this embodiment.

Although, in this specification, description will be made below with attention given to the two base transceiver stations BTS1 and BTS2, the mobile communication system according to this embodiment functions the same even when there are other base transceiver stations BTS.

Figure 5:
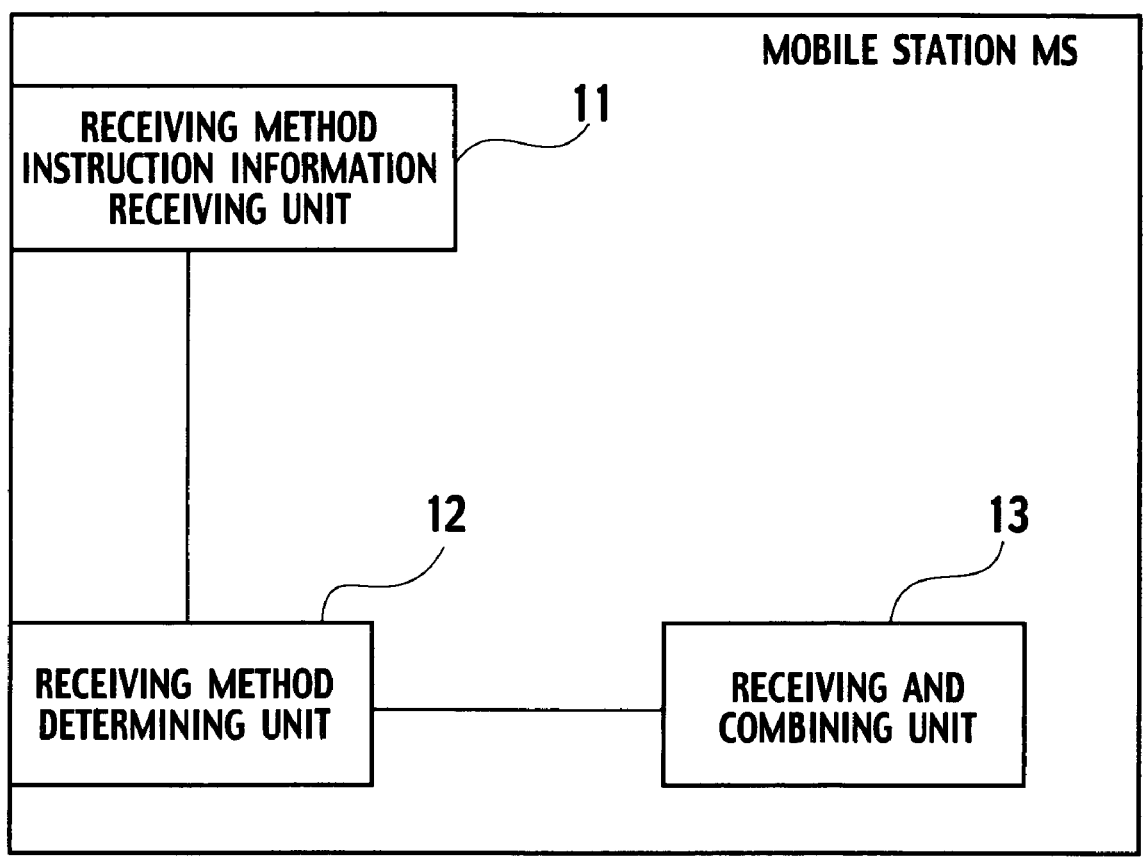
FIG. 5 is a functional block diagram of a mobile station according to a first embodiment of the present invention.

FIG. 5 shows functional blocks of a mobile station MS suitable for use in the mobile communication system according to this embodiment. As shown in FIG. 5, the mobile station MS includes a receiving method instruction information receiving unit 11, a receiving method determining unit 12, and a receiving and combining unit 13.

The receiving method instruction information receiving unit 11 is configured to acquire receiving method selection information for receiving the same information transmitted via the plurality of cells 1 and 2 (broadcast data or multicast data).

Specifically, the receiving method instruction information receiving unit 11 is configured to acquire receiving method instruction information (receiving method selection information) showing soft combining or selective combining from the network (the radio network controller RNC or its upper node) or the base transceiver station BTS1 or BTS2.

The receiving method instruction information may alternatively be formed to show soft combining, selective combining, or no combining processing.

The receiving method instruction information receiving unit 11 may be configured to wait for receiving method instruction information to be transmitted from the network (the radio network controller RNC or its upper node) or the base transceiver station BTS1 or BTS2, or may be configured to voluntarily acquire receiving method instruction information from the network (the radio network controller RNC or its upper node) or the base transceiver station BTS1 or BTS2.

The receiving method determining unit 12 is configured to determine whether to perform soft combining or selective combining on the received same information, based on the above-described receiving method instruction information.

Specifically, the receiving method determining unit 12 is configured to determine that soft combining be performed on the received same information when the receiving method instruction information shows "soft combining", and to determine that selective combining be performed on the received same information when the receiving method instruction information shows "selective combining".

The receiving method determining unit 12 may alternatively be configured to determine whether to perform soft combining or selective combining, or not to perform combining processing on the received same information, based on the receiving method instruction information.

In this case, the receiving method determining unit 12 is configured to determine that soft combining be performed on the received same information when the receiving method instruction information shows "soft combining", and to determine that selective combining be performed on the received same information when the receiving method instruction information shows "selective combining", and to determine that combining processing not be performed on the received same information when the receiving method instruction information shows "no combining processing".

When receiving a plurality of receiving method instruction information, the receiving method determining unit 12 may be configured to select a certain receiving method instruction information according to a predetermined criterion, and to perform the above-described determination based on the selected receiving method instruction information.

The receiving and combining unit 13 is configured to perform soft combining or selective combining (or not to perform combining processing) on the received same information, based on a result of determination by the receiving method determining unit 12.

Figure 6:
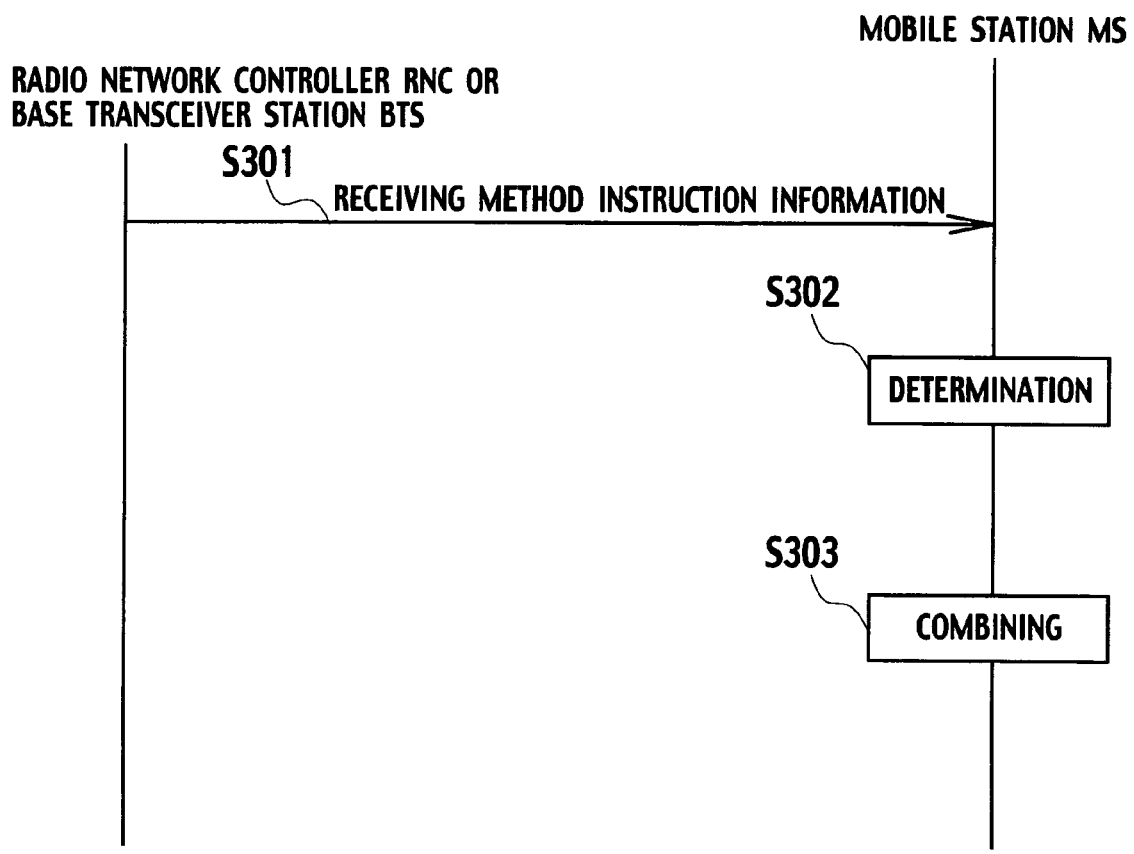
FIG. 6 is a sequence diagram showing operation in a mobile communication system according to the first embodiment of the present invention.

With reference to FIG. 6, operation in the mobile communication system according to this embodiment when the mobile station MS performs reception processing on the same information transmitted via a plurality of cells will be described.

In step 301, the network (the radio network controller RNC or its upper node) or a given base transceiver station BTS (which may be the base transceiver station BTS1 or BTS2, or may be another base transceiver station BTS, for example) transmits the receiving method instruction information to the mobile station MS at a given timing. The network (the radio network controller RNC or its upper node) or the given base transceiver station BTS may transmit the receiving method instruction information to the mobile station MS for each transmission of the same information.

In step 302, the receiving method determining unit 12 of the mobile station MS determines whether to perform soft combing or selective combining, or not to perform combining processing on the received same information, based on the receiving method instruction information received by the receiving method instruction information receiving unit 11.

In step 303, the receiving and combining unit 13 of the mobile station MS performs soft combining or selective combining (or does not perform combining processing) on the received same information, based on a result of the determination by the receiving method determining unit 12.

According to the mobile communication system in this embodiment, since the receiving and combining unit 13 performs soft combining or selective combining (or does not perform combining processing) on the same information, based on receiving method instruction information transmitted from the network (the radio network controller RNC or its upper node) or a given base transceiver station BTS, the mobile station MS can select an optimum information receiving method even when moving between cells or being located in an area where it can receive signals of a plurality of cells.

Mobile Communication System in Second Embodiment of the Invention

Figure 7:
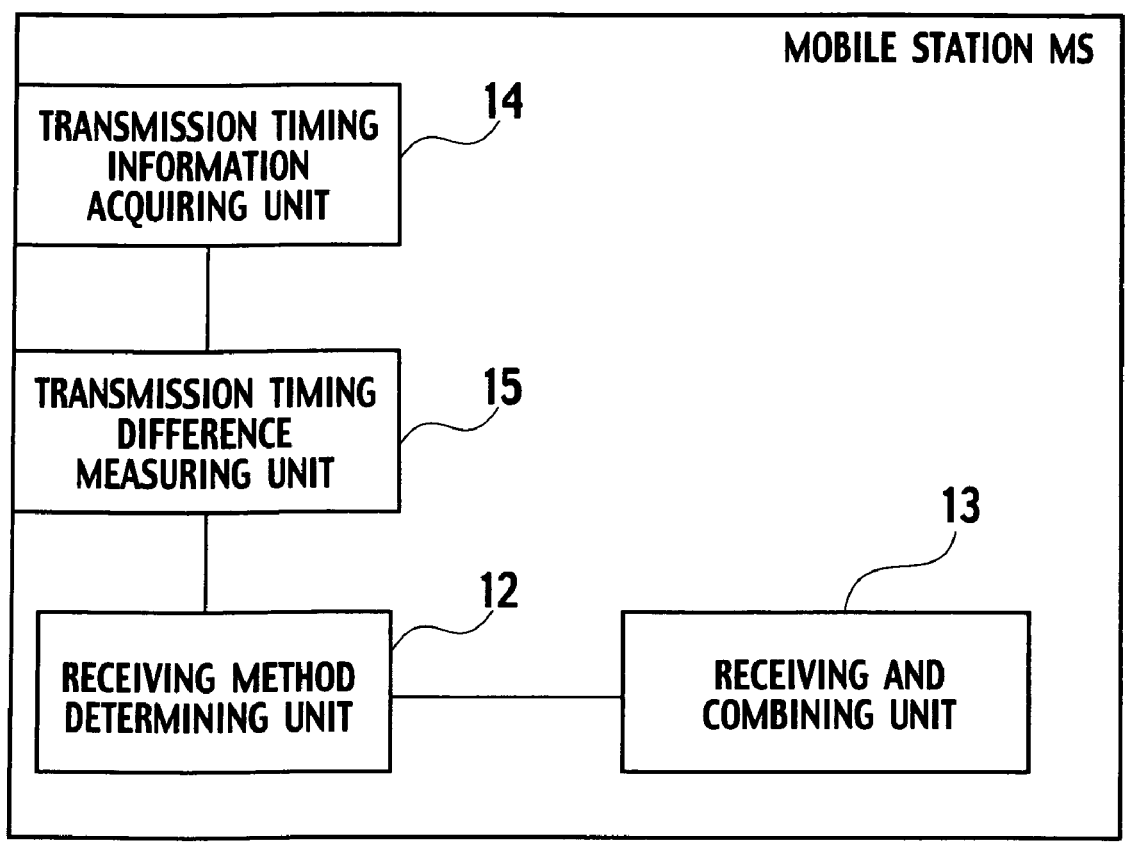
FIG. 7 is a functional block diagram of a mobile station according to a second embodiment of the present invention.
Figure 8:
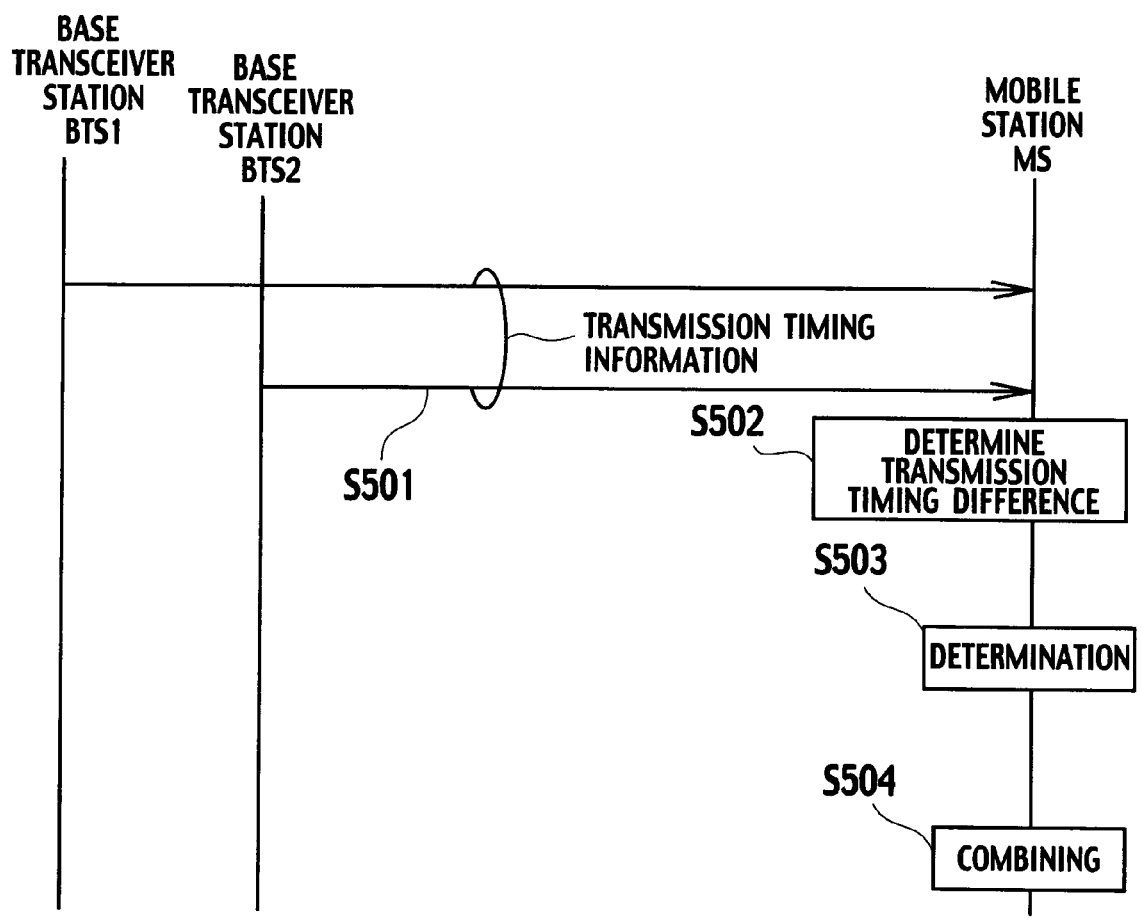
FIG. 8 is a sequence diagram showing operation in a mobile communication system according to the second embodiment of the present invention.

With reference to FIGS. 7 and 8, a mobile communication system according to a second embodiment of the present invention will be described. Hereinafter, differences of the mobile communication system in this embodiment from the above-described mobile communication system in the first embodiment will be mainly described.

As shown in FIG. 7, the configuration of a mobile station MS suitable for use in the mobile communication system of this embodiment includes a transmission timing information acquiring unit 14 and a transmission timing difference measuring unit 15, in which it differs from the configuration of the mobile station MS suitable for use in the mobile communication system of the first embodiment. The mobile station MS may be configured to include the receiving method instruction information receiving unit 11 or may be configured not to include the receiving method instruction information receiving unit 11.

The transmission timing information acquiring unit 14 is configured to acquire receiving method selection information for receiving the same information transmitted via a plurality of cells 1 and 2 (broadcast data or multicast data).

Specifically, the transmission timing information acquiring unit 14 is configured to receive transmission timing information (receiving method selection information) on the cell 1 (base transceiver station BTS1) and the cell 2 (base transceiver station BTS2) from the base transceiver stations BTS1 and BTS2, respectively.

The transmission timing information is formed by information on an absolute time at which broadcast data or multicast data (MBMS service information) is transmitted in a cell (e.g., 17:00:00) or information on a frame (frame information) at which transmission of broadcast data or multicast data is started, for example.

The frame information includes a frame number (SFN: System Frame Number, CFN: Connection Frame Number), and the number of time slots or the number of chips. For example, the frame information includes information of a point of time two slots (256 chips) behind SFN#100.

The transmission timing information acquiring unit 14 may be configured to wait for transmission timing information to be transmitted from the base transceiver stations BTS1 and BTS2, or may be configured to voluntarily acquire receiving method instruction information from the base transceiver stations BTS1 and BTS2.

The transmission timing difference measuring unit 15 is configured to measure a transmission timing difference between the base transceiver stations BTS1 and BTS2, based on transmission timing information received by the transmission timing information acquiring unit 14.

The receiving method determining unit 12 is configured to determine whether to perform soft combining or selective combining, or not to perform combining processing on the received same information, based on the transmission timing difference.

For example, when the transmission timing difference is smaller than a threshold Th1 (has a value within a first range), the receiving method determining unit 12 is configured to determine that soft combining be performed on the received same information. When the transmission timing difference is greater than or equal to the threshold Th1 and smaller than a threshold Th2 (has a value within a second range), the receiving method determining unit 12 is configured to determine that selective combining be performed on the received same information. And, in other cases, the receiving method determining unit 12 is configured to determine that combining processing not be performed on the received same information.

With reference to FIG. 8, operation in the mobile communication system according to this embodiment when the mobile station MS performs reception processing on the same information transmitted via a plurality of cells will be described.

In step 501, the base transceiver stations BTS1 and BTS2 each transmit transmission timing information on the cell 1 (base transceiver station BTS1) and the cell 2 (base transceiver station BTS2) to the mobile station MS at a given timing. The base transceiver stations BTS1 and BTS2 may transmit the transmission timing information to the mobile station MS for each transmission of the same information.

In step 502, the transmission timing difference between the cell 1 (base transceiver station BTS1) and the cell 2 (base transceiver station BTS2) is measured, based on the transmission timing information received by the transmission timing information acquiring unit 14 of the mobile station MS.

In step 503, the receiving method determining unit 12 of the mobile station MS determines whether to perform soft combining or selective combining, or not to perform combining processing on the received same information, based on the transmission timing difference between the cell 1 (base transceiver station BTS1) and the cell 2 (base transceiver station BTS2) measured by the transmission timing information acquiring unit 14.

In step 504, the receiving and combining unit 13 of the mobile station MS performs soft combining or selective combining (or does not perform combining processing) on the received same information, based on a result of the determination by the receiving method determining unit 12.

According to the mobile communication system in this embodiment, since a transmission timing difference between the cell 1 (base transceiver station BTS1) and the cell 2 (base transceiver station BTS2) is measured, based on transmission timing information transmitted from the base transceiver stations BTS1 and BTS2, and the receiving and combining unit 13 performs soft combining or selective combining (or does not perform combining processing) on the same information, based on the measured transmission timing difference, the mobile station MS can select an optimum information receiving method even when moving between cells or being located in an area where it can receive signals of a plurality of cells.

In particular, when soft combining is performed on the same information, strict requirements or conditions are imposed on the memory capacity of a mobile station UE and synchronization between a plurality of cells, compared to when selective combining is performed or combining processing is not performed on the same information.

Accordingly, only when a strict requirement or condition that the transmission timing difference between a plurality of cells be smaller than the threshold Th1 is cleared, the mobile station UE can perform soft combining on the received same information.

Mobile Communication System in Third Embodiment of the Invention

Figure 9:
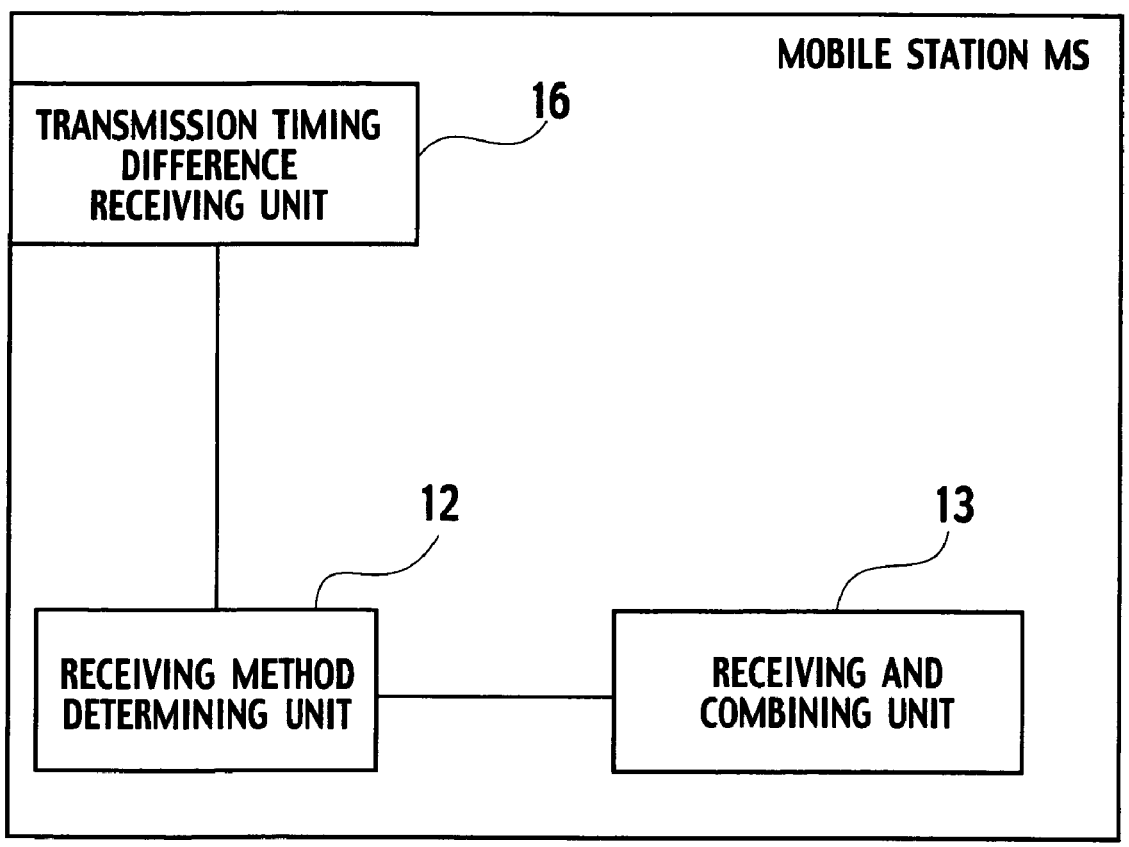
FIG. 9 is a functional block diagram of a mobile station according to a third embodiment of the present invention.
Figure 10:
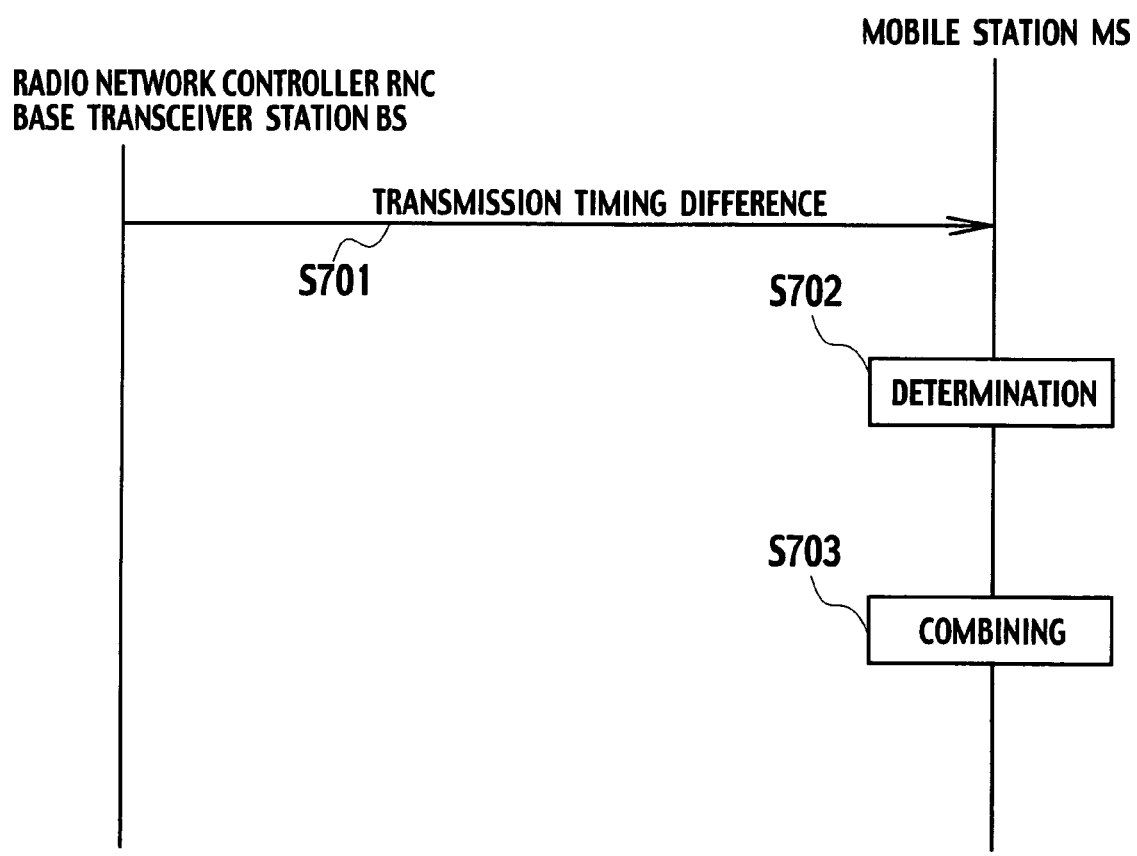
FIG. 10 is a sequence diagram showing operation in a mobile communication system according to the third embodiment of the present invention.

With reference to FIGS. 9 and 10, a mobile communication system according to a third embodiment of the present invention will be described. Hereinafter, differences of the mobile communication system in this embodiment from the mobile communication system in the first embodiment will be mainly described.

As shown in FIG. 9, the configuration of a mobile station MS suitable for use in the mobile communication system according to this embodiment includes a transmission timing difference receiving unit 16, in which it differs from the configuration of the mobile station MS suitable for use in the mobile communication system of the first embodiment. The mobile station MS may be configured to include the receiving method instruction information receiving unit 11, or may be configured not to include the receiving method instruction information receiving unit 11.

The transmission timing difference receiving unit 16 is configured to acquire receiving method selection information for receiving the same information transmitted via a plurality of cells 1 and 2 (broadcast data or multicast data).

Specifically, the transmission timing difference receiving unit 16 is configured to receive a transmission timing difference between the cell 1 (base transceiver station BTS1) and the cell 2 (base transceiver station BTS2) from a network (a radio network controller RNC or its upper node) or the base transceiver stations BTS1 and BTS2.

The transmission timing difference is formed by information on time at which broadcast data or multicast data (MBMS service information) is transmitted in a cell (e.g., 100 ms or 1 s), frame information including a frame number and the number of time slots or the number of chips, or the number of bits, for example.

The transmission timing difference receiving unit 16 may be configured to wait for transmission timing information to be transmitted from the network (the radio network controller RNC or its upper node) or the base transceiver stations BTS1 and BTS2, or may be configured to voluntarily acquire receiving method instruction information from the network (the radio network controller RNC or its upper node) or the base transceiver stations BTS1 and BTS2.

The receiving method determining unit 12 is configured to determine whether to perform soft combining or selective combining, or not to perform combining processing on the received same information, based on the above-described transmission timing difference.

For example, when the transmission timing difference is smaller than a threshold Th1 (has a value within a first range), the receiving method determining unit 12 is configured to determine that soft combining be performed on the received same information. When the transmission timing difference is greater than or equal to the threshold Th1 and smaller than a threshold Th2 (has a value within a second range), the receiving method determining unit 12 is configured to determine that selective combining be performed on the received same information. And, in other cases, the receiving method determining unit 12 is configured to determine that combining processing not be performed on the received same information.

With reference to FIG. 10, operation in the mobile communication system according to this embodiment when the mobile station MS performs reception processing on the same information transmitted via a plurality of cells will be described.

In step 701, the network (the radio network controller RNC or its upper node) or a given base transceiver station BTS (which may be the base transceiver station BTS1 or BTS2, or may be another base transceiver station BTS, for example) transmits a transmission timing difference between the cell 1 (base transceiver station BTS1) and the cell 2 (base transceiver station BTS2) to the mobile station MS at a given timing. The network (the radio network controller RNC or its upper node) or the given base transceiver station BTS may transmit the transmission timing difference to the mobile station MS for each transmission of the same information.

In step 702, the receiving method determining unit 12 of the mobile station MS determines whether to perform soft combining or selective combining, or not to perform combining processing on the received same information, based on the transmission timing difference received by the transmission timing difference receiving unit 16.

In step 703, the receiving and combining unit 13 of the mobile station MS performs soft combining or selective combining (or does not perform combining processing) on the received same information, based on a result of the determination by the receiving method determining unit 12.

According to the mobile communication system in this embodiment, since the receiving and combining unit 13 performs soft combing or selective combining (or does not perform combining processing) on the same information, based on a transmission timing difference transmitted from the network (the radio network controller RNC or its upper node) or a given base transceiver station BTS, the mobile station MS can select an optimum information receiving method even when moving between cells or being located in an area where it can receive signals of a plurality of cells.

Mobile Communication System in Fourth Embodiment of the Invention

Figure 11:
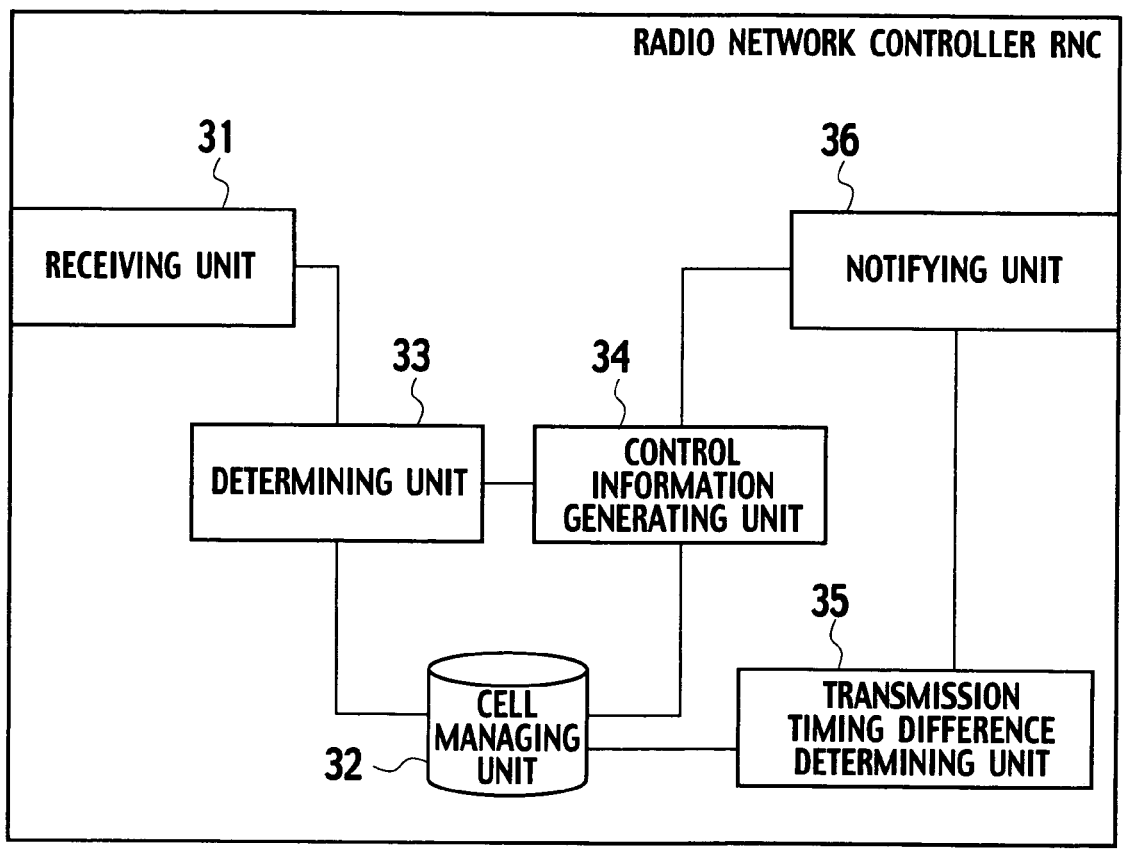
FIG. 11 is a functional block diagram of a radio network controller according to a fourth embodiment of the present invention.
Figure 12:
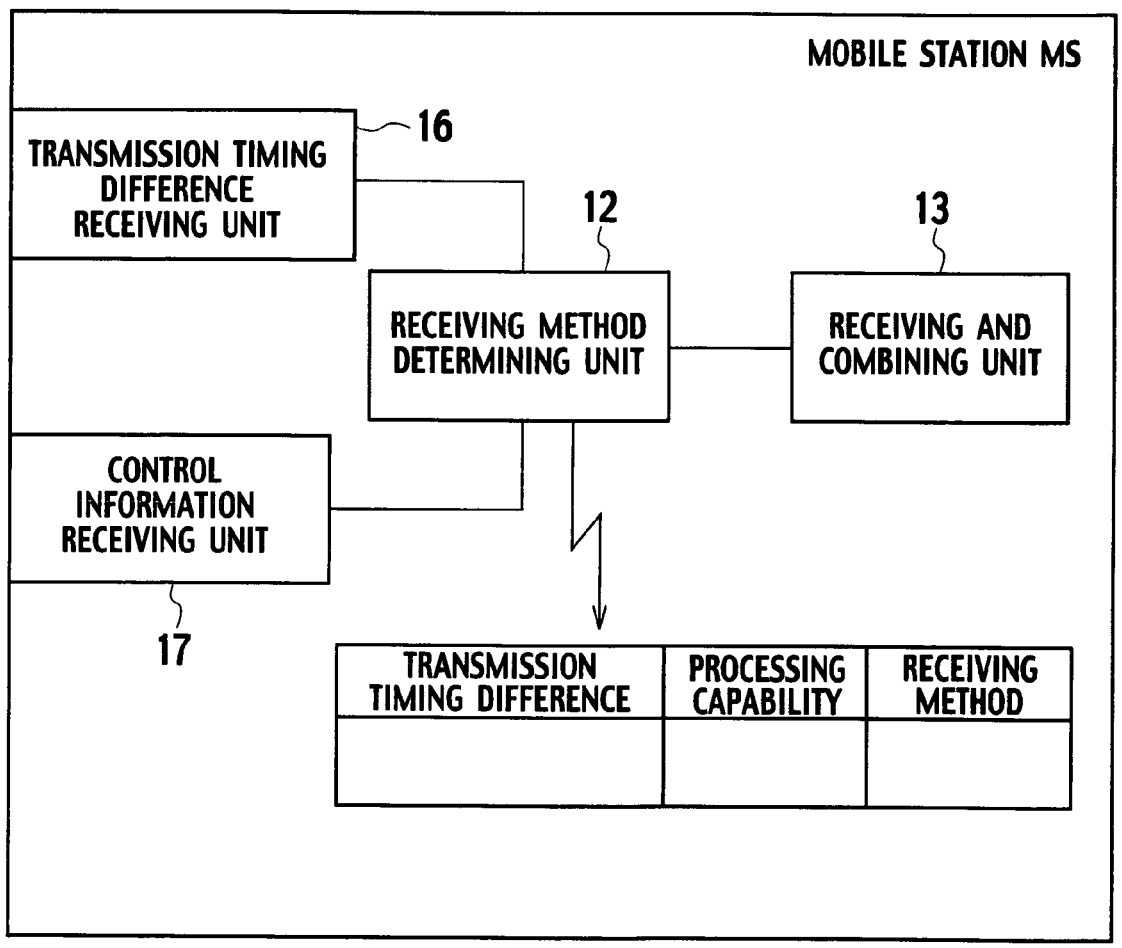
FIG. 12 is a functional block diagram of a mobile station according to the fourth embodiment of the present invention.

With reference to FIGS. 11 to 13, a mobile communication system according to a fourth embodiment of the present invention will be described. Hereinafter, differences of the mobile communication system in this embodiment from the mobile communication systems in the above-described embodiments will be mainly described.

The mobile communication system according to this embodiment provides multimedia broadcast/multicast service (MBMS) to a mobile station MS via a plurality of base transceiver stations BTS1 and BTS2.

A radio network controller RNC according to this embodiment is configured to provide, as the above-described receiving method selection information, control information including information as to whether broadcast service or multicast service can be provided or not in a neighboring cell (cell 2 in FIG. 4) of a current cell (cell 1 in FIG. 4) where the mobile station MS is located.

As shown in FIG. 11, the radio network controller RNC includes a receiving unit 31, a cell managing unit 32, a determining unit 33, a control information generating unit 34, a transmission timing difference measuring unit 35, and a notifying unit 36.

The receiving unit 31 is configured to acquire information necessary for providing broadcast service or multicast service in the multimedia broadcast/multicast service from an upper node of the radio network controller RNC.

The information necessary for providing broadcast service or multicast service includes, for example, information on a cell in which to distribute broadcast data or multicast data, information on a mobile station UE to receive broadcast data or multicast data, and information showing the start (or end) of broadcast data or multicast data.

The cell managing unit 32 is configured to manage locational relationships between cells (especially neighboring relationships between cells), transmission timing information on each cell (each base transceiver station BTS), and channel information on a radio channel (such as a broadcast control channel (BCCH), a MBMS control channel (MCCH) or a MBMS transport channel (MTCH)) used in each cell (each base transceiver station BTS).

The channel information includes, for example, a frequency used, a channelisation code, a scrambling code, a spreading factor, the presence or absence of transmission diversity, and the presence or absence of a pilot symbol.

The determining unit 33 is configured to refer to information received by the receiving unit 31 and information on the locations of cells managed by the cell managing unit 32 to determine whether broadcast service or multicast service can be provided or not in a neighboring cell (such as cell 2) of a current cell (cell 1) in which a mobile station MS is located.

For example, the determining unit 33 is configured to determine whether broadcast service or multicast service can be provided in a neighboring cell or not, based on whether there are available radio resources in the neighboring cell or not, whether the neighboring cell is a cell which distributes broadcast data or multicast data or not, and whether a base transceiver station BTS managing the neighboring cell is equipped with software or hardware which enables MBMS.

The control information generating unit 34 is configured to generate control information including a result of determination by the determining unit 33, that is, information as to whether broadcast service or multicast service can be provided in the neighboring cell or not.

The control information generating unit 34 is also configured to generate control information further including channel information on a radio channel used in the neighboring cell.

The control information generating unit 34 may alternatively be configured to generate only control information on the neighboring cell in which broadcast service or multicast service can be provided.

The transmission timing difference measuring unit 35 is configured to measure a difference between a transmission timing of a base transceiver station BTS in the neighboring cell in which broadcast service or multicast service can be provided and a transmission timing of the base transceiver station BTS1 in the current cell.

The notifying unit 36 is configured to provide, as the receiving method selection information, the control information and the transmission timing difference to a mobile station MS.

The notifying unit 36 may alternatively be configured to provide only control information on the neighboring cell in which broadcast service or multicast service can be provided. Also, the notifying unit 36 may be configured to transmit the information using an existing notification channel or may be configured to transmit the information using a MBMS channel (such as a MCCH or MTCH).

As shown in FIG. 12, a mobile station MS according to this embodiment includes a transmission timing difference receiving unit 16, a control information receiving unit 17, a receiving method determining unit 12, and a receiving and combining unit 13.

The transmission timing difference receiving unit 16 is configured to receive, as receiving method selection information, a transmission timing difference between a current cell (cell 1) in which the mobile station MS is located and a neighboring cell (such as cell 2). Specifically, the transmission timing difference receiving unit 16 is configured to receive a difference between a transmission timing of a base transceiver station BTS in a neighboring cell (such as cell 2) in which broadcast service or multicast service can be provided and a transmission timing of a base transceiver station BTS in the current cell (cell 1).

The transmission timing difference receiving unit 16 may alternatively be configured to receive transmission timing information on the current cell and the neighboring cell, and to determine the transmission timing difference from the transmission timing information.

The control information receiving unit 17 is configured to receive, as receiving method selection information, control information including information as to whether broadcast service or multicast service can be provided or not in a neighboring cell of the current cell (cell 1) in which the mobile station MS is located, and channel information on a radio channel used in the neighboring cell.

The receiving method determining unit 12 is configured to determine whether to perform soft combining or selective combining, or not to perform combining processing on the same information received, based on the transmission timing difference and control information.

For example, as shown in FIG. 12, the receiving method determining unit 12 is configured to include a table in which transmission timing differences, processing capabilities of the mobile station and receiving method s are associated. In this table, the processing capabilities of the mobile station indicate available memory capacities, demodulation capabilities, or the like. Also, in this table, the receiving methods include a soft combining method, a selective combining method and a method not performing combining.

The soft combining method or the selective combining method is, for example, a method to perform soft combining or selective combining using reliability information corresponding to the reception qualities (such as received power, received SIRs or received error rates) of radio channels used in a plurality of cells (base transceiver stations BTS) and channel estimation information.

The selective combining method may be a method of performing selective combining based on the result of a CRC check on the received same information.

The receiving method determining unit 12 is configured to determine a combining method associated with a transmission timing difference received by the transmission timing difference receiving unit 16 and a current processing capability of the mobile station MS, as the combining method for the received same information.

For example, when the transmission timing difference is smaller than a threshold Th1 (has a value within a first range), the receiving method determining unit 12 is configured to determine that soft combining be performed on the received same information. When the transmission timing difference is greater than or equal to the threshold Th1 and smaller than a threshold Th2 (has a value within a second range), the receiving method determining unit 12 is configured to determine that selective combining be performed on the received same information. And, in other cases, the receiving method determining unit 12 is configured to determine that combining processing not be performed on the received same information.

The receiving method determining unit 12 may be configured to determine that a combining method using a predetermined part of or all of the received power, received SIR, received error rate, CRC check result and so on, be performed.

The receiving and combining unit 13 is configured to perform soft combining or selective combining (or not to perform combining processing) on the received same information by a combining method determined by the receiving method determining unit 12.

The receiving and combining unit 13 may also be configured to receive the same information only from a neighboring cell which is managed by a base transceiver station BTS related to received transmission timing difference and control information. That is, when the mobile station MS receives transmission timing difference and control information related to a base transceiver station BTS 10 in a neighboring cell 10 while it does not receive transmission timing difference and control information related to a base transceiver station BTS 20 in a neighboring cell 20, the receiving and combining unit 13 is configured to perform receiving and combining processing only from the same information from the current cell (cell 1) and the neighboring cell 10.

With reference to FIG. 13, operation in the mobile communication system of this embodiment when the mobile station MS performs reception processing on a plurality of pieces of the same information will be described.

In step 1001, the radio network controller RNC transmits, at a given timing, a transmission timing difference between the cell 1 (base transceiver station BTS1) and the cell 2 (base transceiver station BTS 2), and control information on the cells managed by the base transceiver stations BTS1 and BTS2 to the mobile station MS. The radio network controller RNC may transmit the transmission timing difference to the mobile station MS for each transmission of the same information.

In step 1002, the receiving method determining unit 12 of the mobile station MS determines whether to perform soft combining or selective combining, or not to perform combining processing on the received same information, based on the transmission timing difference received by the transmission timing difference receiving unit 16 and the control information received by the control information receiving unit 17.

In step 1003, the receiving and combining unit 13 of the mobile station MS performs soft combining or selective combining (or does not perform combining processing) on the received same information, based on a result of the determination by the receiving method determining unit 12.

According to the mobile communication system in this embodiment, since the receiving and combining unit 13 performs soft combining or selective combining (or does not perform combining processing) on the same information, based on a transmission timing difference and control information related to a neighboring cell transmitted from the radio network controller RNC, even when the mobile station MS moves between cells, it can select an optimum information receiving method without receiving notification information transmitted from the neighboring cell.

Mobile Communication System in Fifth Embodiment of the Invention

With reference to FIG. 14, a mobile communication system according to a fifth embodiment of the present invention will be described. Hereinafter, differences of the mobile communication system in this embodiment from the mobile communication systems in the above-described embodiments will be mainly described.

A radio network controller RNC in this embodiment is configured to include a receiving method determining unit 37 in place of the transmission timing difference measuring unit 35 in the radio network controller RNC in the fourth embodiment.

The receiving method determining unit 37 is configured to determine a combining method for the same information received at a mobile station MS, based on a result of determination by a determining unit 33, control information generated by a control information generating unit 34, locational relationships between cells managed by a cell managing unit 32, and so on. The determining method is the same as the determining method in the receiving method determining unit 12 of the above-described mobile station MS.

A notifying unit 36 is configured to transmit, to a mobile station MS, a combining method determined by the receiving method determining unit 37 together with control information on a neighboring cell of the cell in which the mobile station MS is located.

INDUSTRIAL APPLICABILITY

As described above, the present invention can provide a mobile communication system, a mobile station and a radio network controller which enable selection of an information receiving method at a mobile station MS so as to avoid an increase in the transmission power of a base transceiver station BTS or redundancy or loss of received information at the mobile station MS in broadcast communication or multicast communication.

The invention claimed is:

1. A mobile communication system for transmitting same information to a mobile station via a plurality of cells, the system comprising:
   the mobile station configured to receive, as receiving method selection information, control information on a neighboring cell of a current cell in which the mobile station is located transmitting the same information; and
   the mobile station configured to determine whether to perform soft combining or selective combining on the same information received, based on the receiving method selection information for receiving the same information via the current cell and the neighboring cell.

2. The mobile communication system as set forth in claim 1, wherein a radio network controller provides, as the receiving method selection information, the control information including information as to whether broadcast service or multicast service can be provided or not in the neighboring cell of the current cell in which the mobile station is located.

3. A mobile communication system for transmitting same information to a mobile station via a plurality of cells, the system comprising:
   the mobile station configured to receive, as receiving method selection information, control information on a neighboring cell of a current cell in which the mobile station is located transmitting the same information; and
   the mobile station configured to determine whether to perform soft combining or selective combining, or not to perform combining processing on the same information received, based on the receiving method selection information for receiving the same information via the current cell and the neighboring cell.

4. A mobile station comprising:
   a receiving method selection information acquiring unit configured to acquire, as receiving method selection information, control information on a neighboring cell of a current cell in which the mobile station is located transmitting the same information for receiving same information transmitted via the current cell and the neighboring cell; and
   a determining unit configured to determine whether to perform soft combining or selective combining on the same information received based on the receiving method selection information.

5. The mobile station as set forth in claim 4, wherein the determining unit is configured to determine whether to perform soft combining or selective combining, or not to perform combining processing on the received same information, based on the receiving method selection information.

6. The mobile station as set forth in claim 4, wherein:
   the receiving method selection information acquiring unit is configured to acquire receiving method instruction information showing soft combining or selective combining from a network or a base transceiver station; and
   the determining unit is configured to perform the determination based on the receiving method instruction information.

7. The mobile station as set forth in claim 4, wherein:
   the receiving method selection information acquiring unit is configured to receive, as the receiving method selection information, transmission timing information on the current cell and the neighboring cell from the current cell and the neighboring cell, respectively;
   the mobile station further comprise a transmission timing difference measuring unit configured to measure a transmission timing difference between the current cell and the neighboring cell, based on the received transmission timing information; and
   the determining unit is configured to perform the determination based on the transmission timing difference.

8. The mobile station as set forth in claim 4, wherein:
   the receiving method selection information acquiring unit is configured to receive, as the receiving method selection information, a transmission timing difference between the current cell and the neighboring cell from a network or a base transceiver station; and
   the determining unit is configured to perform the determination based on the transmission timing difference.

9. The mobile station as set forth in claim 8, further comprising:
   a storage unit configured to associate and store the transmission timing differences and combining methods for the same information;
   wherein, the determining unit is configured to perform the determination based on the combining method associated with the received transmission timing difference.

10. The mobile station as set forth in claim 8, further comprising:
    a storage unit configured to associate and store the transmission timing differences, processing capabilities of the mobile station, and combining methods for the same information;
    wherein, the determining unit is configured to perform the determination based on the combining method associated with the received transmission timing difference and the processing capability of the mobile station.

11. The mobile station as set forth in claim 8, wherein the determining unit is configured to determine that soft combining be performed on the received same information, by using all predetermined reliability information corresponding to reception qualities of radio channels used in the current cell and the neighboring cell, when the received transmission timing difference has a value within a first range.

12. The mobile station as set forth in claim 8, wherein the determining unit is configured to determine that selective combining be performed on the received same information, by comparing part of predetermined reliability information corresponding to reception qualities of radio channels used in the current cell and the neighboring cell, when the received transmission timing difference has a value within a second range.

13. The mobile station as set forth in claim 4, wherein:
    the receiving method selection information acquiring unit is configured to acquire, as the receiving method selection information, control information including information as to whether broadcast service or multicast service can be provided or not in the neighboring cell of the current cell in which the mobile station is located; and
    the determining unit is configured to perform the determination based on the control information.

14. The mobile station as set forth in claim 13, wherein the control information includes channel information on a radio channel used in the neighboring cell.

15. The mobile station as set forth in claim 13, wherein:
    the receiving method selection information acquiring unit is configured to acquire, as the receiving method selection information, a difference between a transmission timing in the neighboring cell in which broadcast service or multicast service can be provided and a transmission timing in the current cell; and the determining unit is configured to perform the determination based on the control information and the transmission timing difference.

16. The mobile station as set forth in claim 13, wherein the determining unit is configured to perform the determination for the same information received from the neighboring cell in which broadcast service or multicast service can be provided.

17. A radio network controller for use in a mobile communication system for transmitting same information to a mobile station via a plurality of cells, comprising:
  a determining unit configured to determine whether broadcast service or multicast service can be provided or not in a neighboring cell of a current cell in which the mobile station is located;
  a notifying unit configured to provide control information including a result of the determination, as receiving method selection information for receiving the same information at the mobile station; and
  a receiving method instructing unit configured to provide an instruction on whether to perform soft combining or selective combining on the same information received at the mobile station, based on the receiving method selection information.

18. The radio network controller as set forth in claim 17, wherein the notifying unit is configured to provide, as the receiving method selection information, only the control information on the neighboring cell in which broadcast service or multicast service can be provided.

19. The radio network controller as set forth in claim 17, wherein the control information includes channel information on a radio channel used in the neighboring cell.

20. The radio network controller as set forth in claim 17, wherein the notifying unit is configured to transmit, as the receiving method selection information, a difference between a transmission timing in the neighboring cell in which broadcast service or multicast service can be provided and a transmission timing in the current cell.

21. A radio network controller for use in a mobile communication system for transmitting same information to a mobile station via a plurality of cells, comprising:
  a receiving method instructing unit configured to provide an instruction on whether to perform soft combining or selective combining on the same information received at the mobile station, based on a transmission timing difference between the plurality of cells.

22. The radio network controller as set forth in claim 21, wherein the receiving method instructing unit is configured to provide the instruction based on the transmission timing difference between the plurality of cells and a processing capability of the mobile station.

* * * * *